United States Patent Office 3,321,612
Patented May 23, 1967

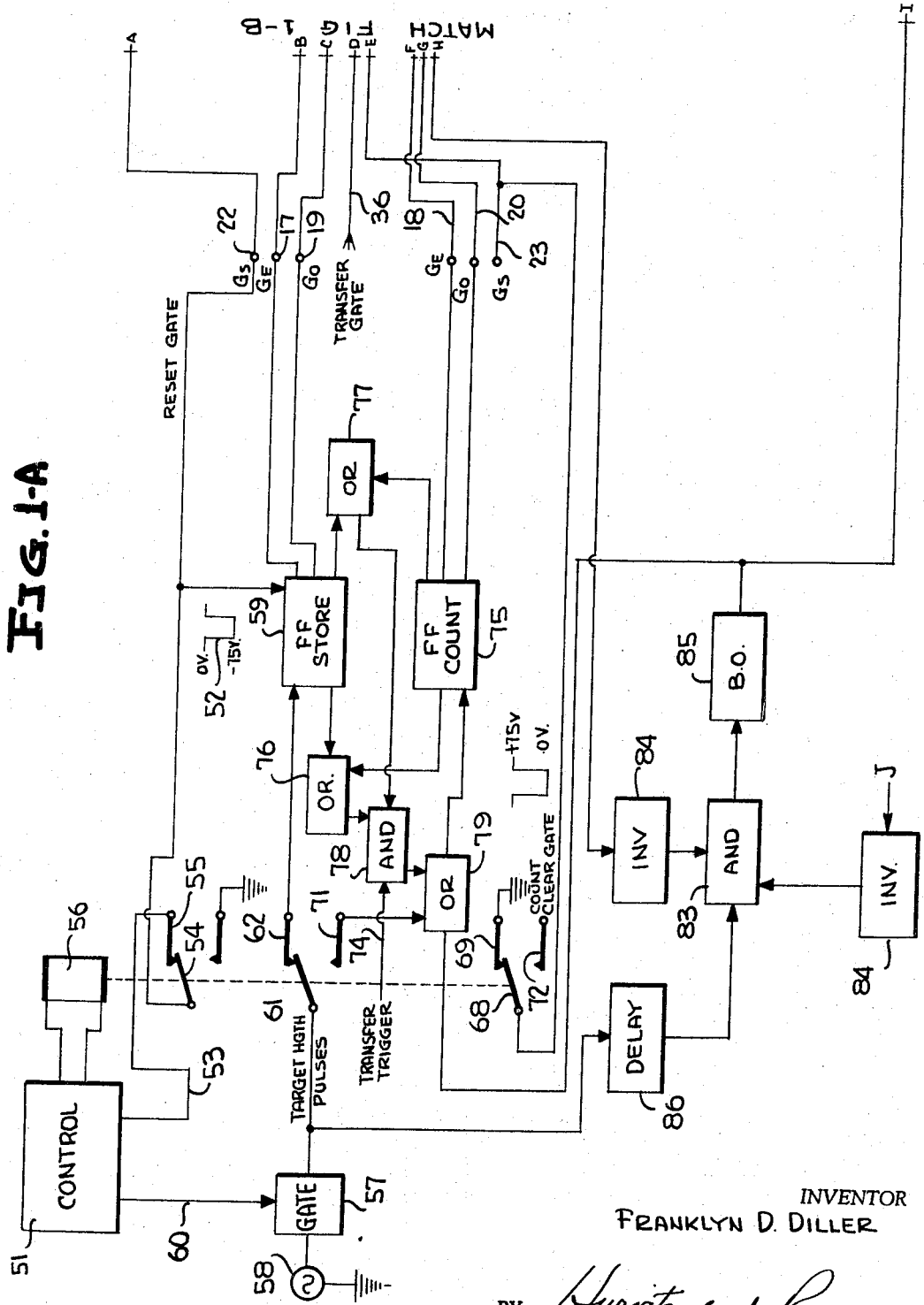

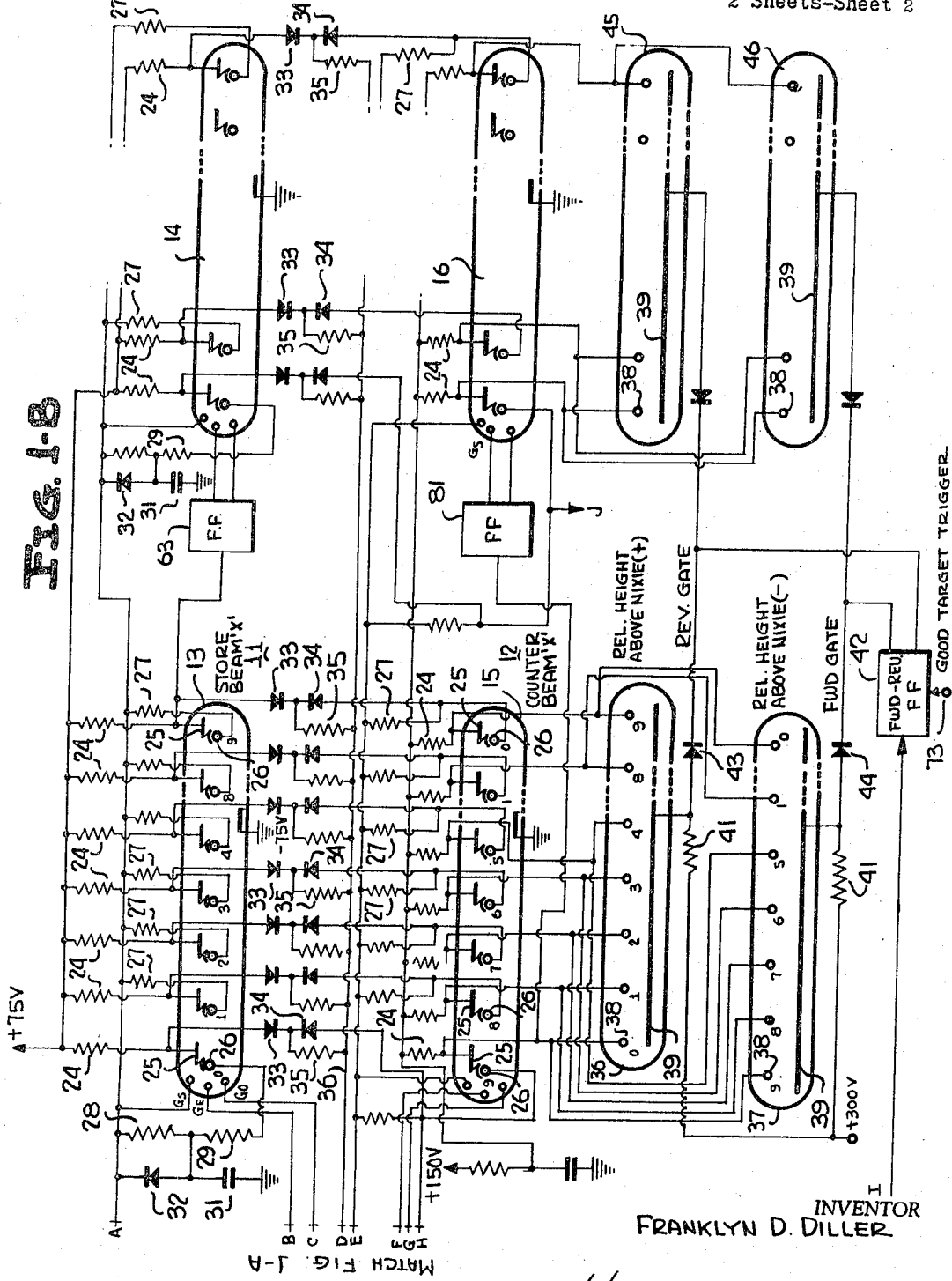

3,321,612
SUBTRACTION CIRCUIT
Franklyn D. Diller, Loveland, Ohio, assignor to Avco Corporation, Cincinnati, Ohio, a corporation of Delaware
Filed Nov. 12, 1963, Ser. No. 322,688
25 Claims. (Cl. 235—176)

The present invention relates to computers for subtracting a second digital signal from a first digital signal and more particularly to a computer having a register feeding a pair of indicators, which respectively provide answers for positive and negative subtraction results.

It is an object of the present invention to provide a new and improved digital subtraction circuit wherein indications of positive and negative results are presented.

Another object of the invention is to provide a multidecade digital subtraction circuit including a pair of numerical indicator tubes for each decade, wherein only one of said tubes is activated at a time in accordance with the polarity of the answer.

An additional object is to provide a multidecade decimal subtraction circuit wherein a pair of digit indicating discharge tubes for each decade is fed by a multianode computing discharge tube so that simple circuitry exists between the load and the driver.

A further object of the invention is to provide a digital subtracting circuit wherein multianode beam switching tubes are utilized for shift registers that feed tubes which provide visual digit indications.

Briefly, the foregoing objects are accomplished by a circuit employing first and second multianode beam tube shift registers for each of a plurality of cascaded decades. After a count indicative of the minuend in the subtraction operation has been loaded into the appropriate decades of the first tubes, its nine's complement is transferred from each first tube into the second tubes. This is accomplished by having the numerically ordered anodes of the second or count tube selectively connected to the nine's complement discharge paths associated with the respective anodes of the first tube.

The subtrahend is then serially applied to the second shift register tubes. Thereby, the count stored in the lowest decade count tube is advanced until the count therein reaches nine. If each higher order decade is not set to nine when the next subtrahend pulse occurs, the count in the second tube for the lowest order decade advances from nine to zero. With each higher order decade set at nine, and the lowest decade set on eight, the following subtrahend pulse causes the count tube of every decade to be set to zero. In response to the next subtrahend pulse, the number in the lowest decade count tube is transferred in the usual manner from zero to one.

In conjunction with each count tube is provided a pair of multicathode, gas, numerical indicating tubes. A first of the indicating tubes is activated when the number in the count tubes has not been advanced through zero, hence provides a visual indication of positive results. The numerically ordered cathodes of the first indicator tube are connected to the nine's complement anodes of the count tube to provide the correct numerical display for positive results. The second indicator tube for the lowest decade order is activated only when the count in each decade advances from nine to zero to thereby indicate a zero or negative result. The numerically ordered cathodes of the second tube are directly responsive to the similarly denominated count tube anodes, hence provide the correct numerical display for negative results.

It is thus seen that a feature of the invention resides in the simplicity of the circuitry involved, whereby simple switching circuits between the count and indicator tubes are utilized. Also, easily recognized visual indications of positive or negative results are provided to reduce the possibility of error regarding answer polarity.

The above and still further objects, features and advantages of the present invention will become apparent upon consideration of the following detailed description of one specific embodiment thereof, especially when taken in conjunction with the accompanying drawing, wherein:

FIGURES 1a and 1b, taken together as a single figure, are a circuit diagram of a preferred embodiment of the invention.

Reference is now made to the single figure of the drawing wherein a pair of two decade decimal registers 11 and 12 is illustrated. The first and second decades of register 11 comprise a pair of ten anode, beam switching tubes 13 and 14, respectively. Register 12 includes two similar tubes 15 and 16, which preferably are of the Beam X type, manufactured by Burrough's Corporation.

As is well known, a Beam X tube includes ten targets or anodes for a single electron beam that emanates from a cathode. Associated with each target are switching and shield grids as well as a spade electrode. Each of the switch grids associated with odd targets is connected to a common pin while the even switch grids are connected to another common pin. To switch the discharge path from an odd target to the adjacent even target, the odd common pin is triggered while the converse holds for switching from an even to an odd target. To extinguish the beam, it is necessary to place a potential on all the spade and shield electrodes having a value approximately equal to that of the cathode.

In the present disclosure, the common convention of showing the even and odd pins is utilized whereby the even pins for tubes 13 and 15 are respectively denominated 17 and 18 and the odd pins for these tubes bear the reference numerals 19 and 20. All of the shield grids for tubes 13 and 14 are connected to terminal 22 while the shield grids for tubes 15 and 16 are connected to terminal 23. B+ voltages for the target electrodes 25 of each tube are established via connections through appropriately valued load resistors 24 to positive voltages from a D.C. power supply while the tube cathodes are biased to ground or a negative voltage to provide proper tube operation.

Energizing voltage for each spade 26 in tubes 13–16, except the zero spades of tubes 13 and 14, is provided via resistors 27 connected to terminals 22 and 23. To insure resetting of tubes 13 and 14 back to their zero targets when a count is extinguished, the spades associated with the zero targets are connected to terminal 22 through a voltage divider comprising resistors 28 and 29. The midpoint of the divider is connected to capacitor 31, the other side of which is grounded, and the anode of diode 32, having its cathode tied to terminal 22.

A connection between each target in tubes 13 and 14 with an associated spade in tubes 15 and 16 is established via a pair of back to back diodes 33 and 34, the cathodes of which are coupled via resistors 35 to a transfer gating source feeding lead 36. The connections between the targets and spades are such that the targets of tubes 13 and 14 are always connected to the nine's complement of the spades in tubes 15 and 16, as seen by Table I for the connections between tubes 13 and 15.

Table I

| Spade of tube 15: | Target of tube 13 |
|---|---|
| 0 | 9 |
| 1 | 8 |
| 2 | 7 |
| 3 | 6 |
| 4 | 5 |
| 5 | 4 |
| 6 | 3 |
| 7 | 2 |
| 8 | 1 |
| 9 | 0 |

To provide an indication of the positive or negative number registered in tube 15, discharge tubes 36 and 37 are respectively provided. Tubes 36 and 37 are of the well known Nixie type having ten cold cathodes 38 and an anode 39. A discharge is formed between the cathode having current supplied thereto and the anode in such a manner that a visual indication of the number associated with the cathode is provided.

The cathodes of tube 36 are connected to the nine's complement target of tube 15 while similarly numbered cathodes of tube 37 and targets of tube 15 are connected together, as seen by reference to Table II.

Table II

| Target number of tube 15 | Cathode number of— | |
|---|---|---|
| | Tube 36 | Tube 37 |
| 0 | 9 | 0 |
| 1 | 8 | 1 |
| 2 | 7 | 2 |
| 3 | 6 | 3 |
| 4 | 5 | 4 |
| 5 | 4 | 5 |
| 6 | 3 | 6 |
| 7 | 2 | 7 |
| 8 | 1 | 8 |
| 9 | 0 | 9 |

To provide energization for tubes 36 and 37, their anodes 39 are connected via separate load resistors 41 to a +300 volt D.C. source. To enable only one of tubes 36 or 37 to be energized at a time, the complementary outputs of flip flop 42 are connected through diodes 43 and 44 to the tube anodes. It is to be understood that similar connections for the second decade subsist between tubes 16, 45 and 46 as well as between flip flop 42 and tubes 45 and 46.

To control the flow of information into and between registers 11 and 12 as well as between register 12 and indicator tubes 36, 37, 45, 46, circuit 51 is provided.

At the beginning of each computation cycle, control circuit 51 derives a gating voltage 52 on lead 53 to reset tubes 13 and 14 to their zero targets, and flip flop 59 to the proper state for first pulse switching. The voltage on lead 53 is passed to terminal 22 via normally closed contacts 54, 55 of relay 56. The negative portion of voltage 52 extinguishes the beam of tube 13 to erase the count previously stored therein. In response to the trailing edge of waveform 52, the voltages on shield terminal 22 and the 1–9 spades of tube 13 rise to ground. The voltage on the zero spade remains below ground, however, because a high impedance discharge exists through diode 32 for the negative charge applied to capacitor 31 by waveform 52. In consequence, the beam, when restored, locks on to target zero. An identical operation occurs for tube 14 so register 11 stores a zero count in each of its decades at the beginning of each operation cycle.

A signal is now derived from circuit 51 on lead 60 to open gate 57, whereby a number of pulses equal to the minuend are applied from oscillator 58 to driver flip flop 59 via contacts 61, 62 of relay 56. The signal on lead 60 opens gate 57 for a time period just long enough to allow the number of pulses commensurate with the minuend to be passed to bistable flip flop 59.

As is well known, each pulse applied to flip flop 59 causes its state to be changed. The complementary outputs of flip flop 59 are applied to even and odd switching grids 17 and 19 of tube 13. In response to each state change of flip flop 59, the beam in tube 13 is advanced from one target 25 to the adjacent, higher numbered target until the ninth target is reached, at which time the beam returns to target zero.

As the beam leaves target nine of tube 13, a positive going voltage is derived at that target. This voltage is applied via bistable flip flop 63 to the even and odd switching electrodes of tube 14 to position the beam on the adjacent, higher target of tube 14. Thereby, a carry between decades is effected and the number of decades may be increased, as required by the magnitude of the numbers expected to be subtracted.

While pulses are being counted into register 11, the beam in tubes 15 and 16 is cut off by virtue of ground potential (cathode potential for these tubes) being applied to the spades and shields thereof via contacts 68, 69. Thereby, cathodes 38 of indicator tubes 36, 37, 45, 46 are maintained at approximately the same potential as anodes 39 for the indicator tubes to preclude current flow therein and prevent indications being derived from them.

When the minuend has been loaded into register 11 and an indication that the subtrahend is available exists, gate 57 is closed by the signal on lead 60 to block the passage of pulses from oscillator 58. If the subtrahend is not available, as may occur in a real time computer, relay 56 is not activated and a new minuend may be loaded into register 11 by causing waveform 52 to be generated.

But if the minuend is available, relay 56 is energized simultaneously with gate 57 closing to ground contact 54, connect contacts 61 and 71 together and connect contact 68 with lead 72 from circuit 51. At the same time, a voltage is applied to lead 73 by circuit 51 to insure the application by flip flop 42 of a larger voltage to the cathode of diode 43 than to diode 44. Thereby, tubes 36 and 45 are invariably activated prior to tubes 37 and 46 so the former always provide positive subtraction results and the latter negative results. The reason for this will be more clearly seen infra.

Simultaneously with activation of relay 56, a transfer trigger is derived from circuit 51 on lead 74. The transfer trigger causes driver flip flop 75 for counting tube 15 to be driven to the opposite state from flip flop 59, the driver for tube 13. This is necessary to insure activation of the opposite even or odd switching electrode in tube 15 by the first subtrahend pulse from that which would be activated by the next minuend pulse applied to tube 13. Otherwise, the first subtrahend pulse could activate flip flop 75 into a state that would not cause beam switching in tube 15. This would result in the minuend pulse being dropped to cause errors.

To compare the states of flip flops 59 and 75, the complementary outputs thereof are applied to OR gates 76 and 77 such that gates 76 and 77 derive the Boolean functions $(A+\overline{B})$ and $(\overline{A}+B)$, respectively; where A and B represent the states of flip flops 59 and 75, while $\overline{A}$ and $\overline{B}$ represent the binary complements of A and B. The outputs of gates 76 and 77 are combined in AND gate 78 so that the latter is enabled to pass the trigger on lead 74 only when the states of flip flops 59 and 75 are the same, i.e. when $AB=1$. The trigger is fed through OR gate 79 to change the state of flip flop 75 so it is the complement of that of flip flop 59. If flip flops 59 and 75 are of opposite state when the trigger is applied to lead 74, i.e. $AB=0$, AND gate 78 is not enabled to preclude flip flop 75 changing state.

After the contacts of relay 56 are closed, circuit 51 generates transfer and count clear gates on leads 36 and 72, respectively. The negative going portion of the count clear gate terminates prior to that of the transfer gate. In consequence, a beam is formed in tube 15 while a negative voltage is still being applied to the cathodes of diodes 33 and 34. With such a voltage applied to diodes 33 and 34, a conduction path exists between each target, spade combination of tubes 13, 15. The voltage applied to each spade in tube 15 from its associated target in tube 13 is relatively large except for the voltage applied by the spade on which the beam of tube 13 alights. In consequence, only the spade of tube 15 connected to the energized target of tube 13 is maintained at a voltage to promote the formation of a beam in tube 15. It is thus seen that the number stored in the register comprising tube 13 is transferred as its nine's complement into the register comprising tube 15. A similar transfer operation occurs between tubes 14 and 16. Thereby, the nine's complement of the minuend number stored in each decade of register 11 is transferred into the corresponding decade of register 12.

After the trailing edge of the transfer gate occurs, a signal is generated on lead 60 by control circuit 51 to open gate 57. Gate 57 remains open for a time period just long enough to permit a number of pulses, equal to the subtrahend, to be serially applied by oscillator 58 to the input of bistable flip flop 75. Flip flop 75 drives the beam of tube 15 to the adjacent higher number by applying complementary voltages to terminals 18 and 20 in the same manner that flip flop 59 drives tube 13. For carry purposes, the nine target of tube 15 is connected via driver flip flop 81 to the switch electrodes of tube 16, in a manner similar to the connection between tubes 13 and 14.

As indicated supra, flip flop 42 controls whether indicator tube 36 or 37 is energized and tube 36 is always activated when the subtrahend is initially applied to register 12. Flip flop 42 maintains tube 36 activated as long as the minuend exceeds the subtrahend so that only positive results are indicated thereby. When the subtrahend equals the minuend, the "nine" targets of tubes 15 and 16 are ignited. This causes an enabling voltage to be applied by the "nine" spades of tubes 15 and 16 via inverters 84 to AND gate 83. If more than two decades are utilized, the nine spade for each of the higher order decades applies a similar voltage to enable gate 83. Thereby, the gate is enabled only when all of the decades has reached a nine count.

With gate 83 open, the pulse from oscillator 58 that advanced the beam of tube 15 to the nines spade, is passed in delayed form to blocking oscillator 85. The pulse is delayed in circuit 86 by an amount sufficient to insure beam transfer in tube 15 from its "eight" to its "nine" target, whereby time coincidence between the enabling inputs to AND gate is assured. In response to the pulse deriving from gate 83, blocking oscillator 85 generates a short duration trigger that is applied in parallel to flip flop 42 and OR gate 79. The trigger applied to flip flop 42 changes the state thereof, causing deactivation and activation of tubes 36 and 37, respectively, because the voltage applied to the anode of the former is considerably less than that applied to the former.

The pulse applied by oscillator 85 to OR gate 79 feeds flip flop 75 to advance the beam of tube 15 to the zero spade. The beam of tube 16 is now advanced to the zero spade in response to tube 15 leaving its "nine" spade. Thereby, each of the decades in register 12 is activated to the zero state and zero indications are derived from tubes 37 and 46.

Each of the foregoing operations takes place at very high speed so that the circuit is in quiescent condition upon the occurrence of the next subtrahend pulse from oscillator 58. This pulse advances the beam of tube 15 from the zero to the first target and causes the "one" cathode of negative indicating tube 37 to be activated. The operation continues in this manner for each succeeding subtrahend pulse until gate 57 is closed and a stationary, visual presentation of the negative result is presented on tubes 37 and 46. Of course, if the subtrahend does not exceed the minuend, beam tubes 15 and 16 never both reach their ninth targets, and tubes 36 and 45 remain lit to provide a positive indication.

To explain the operation of the machine more fully, a pair of examples is given. First let it be assumed that the operation (5−2) is to be performed. In response to five minuend pulses from oscillator 58, target five of tube 13 is activated. The response of target five is then transferred to the fourth target of tube 15. A pair of pulses are now applied to tube 15 whereby its beam impinges on target six thereof. This causes the third cathode of tube 36 to be energized so that the correct answer is observed.

Next, assume that the operation (5−6) is executed. As before, a minuend of five causes target four of tube 15 to be activated. In response to the first five subtrahend pulses, but prior to the fifth pulse deriving from delay network 86, the "nine" spades of tubes 15 and 16 are energized. Thereby, gate 83 is enabled so the delayed fifth subtrahend pulse causes activation of tube 37, and advancement of the beam in tubes 15 and 16 to the "zero" target. The sixth pulse advances the beam of tube 15 to target "one," whereby cathode "one" of negative indicating tube 37 is lit.

It is to be understood that the present invention is not limited to number systems having ten as their base although its primary utility exists in connection with base ten because of the ease with which indicator tubes 37 and 46 are read. For base M, each order would include a pair of M state tubes wherein the Gth target of tube 13 is connected to the (M−1−G)th spade of tube 14. For positive results, the Kth target of tube 15 is connected to the (M−1−K)th cathode of indicator 36, while for negative results the Kth target of tube 15 is connected to the Kth cathode of tube 37.

While I have described and illustrated one specific embodiment of my invention, it will be clear that variations of the details of construction which are specifically illustrated and described may be resorted to without departing from the true spirit and scope of the invention as defined in the appended claims.

I claim:

1. A circuit for subtracting a serial second decimal signal from a first decimar signal comprising a first ten state decimal register, means for supplying said first signal in nine's complement form to said register, means for advancing the count stored in said register in response to each serial digit of said second signal, a pair of decimal indicators responsive to the count stored in said register, each digit of one of said indicators being responsive to the nine's complement of the count stored in said register, each digit of the other of said indicators being responsive to the count stored in said register, means for selectively activating only one of said indicators at a time, said last named means including means for activating said other indicator only in response to the count of the second signal exceeding that of the first signal, and means for setting the count of said first register to zero in response to the counts of said two signals being equal.

2. The circuit of claim 1 wherein said register comprises: a switching tube having ten targets and a cathode, means for selectively establishing a discharge between each of said targets and said cathode; said last named means and said means for advancing including means for successively moving said discharge from one of said anodes to the adjacent anode.

3. The circuit of claim 2 wherein each of said indicators comprises: another tube having ten electrodes between which discharge paths are established with a common electrode, means for selectively establishing a discharge between each of said ten electrodes and said common electrode of said another tube; said last named means including means for applying the discharge from each target of the first named tube to an electrode of said another tube.

4. The circuit of claim 2 wherein each of said indicators comprises: a discharge tube having ten electrodes and a cathode, means for selectively establishing a discharge between each of said electrodes and said cathode; said last named means including; means for establishing a current in response to the count stored in said register, and means for applying said current to one of said targets.

5. A circuit for subtracting a second serial signal of radix M from a first signal of radix M comprising a shift register having M states denominated as $0, 1 \ldots N \ldots (M-1)$, means for supplying said first signal in $(M-1-N)$ complement form to said register, means for advancing the count stored in said register in response to each said digit of said second signal, a pair of M digit indicators responsive to the count stored in said register, each digit of one of said indicators being responsive to the $(M-1-N)$ complement of the count stored in said register, each digit of the other of said indicators being responsive to the count stored in said register, means for selectively activating only one of said indicators at a time, said last named means including means for activating said other indicator only when the count of the second signal exceeds that of the first signal, and means for setting the count of said shift register to zero in response to the counts of said two signals being equal.

6. A circuit for subtracting a serial second signal of radix M from a first signal of radix M comprising K cascaded stages, where K equals any integer greater than zero, each of said stages including; a shift register having M states denominated as $0, 1 \ldots N \ldots (M-1)$, means for supplying said first signal in $(M-1-N)$ complement form to said register, means for advancing the count stored in said register in response to each serial digit of said second signal, a pair of M digit indicators responsive to the count stored in said register, each digit of one of said indicators being responsive to the $(M-1-N)$ complement of the count stored in said register, each digit of the other of said indicators being responsive to the count stored in said register, means for selectively activating only one of said indicators at a time, said last named means including means for activating said other indicator only when the count of the second signal exceeds that of the first signal; means for setting the count of said registers to zero in response to the counts of said two signals being equal, and means for advancing the count stored in the register of the Ith stage in response to attainment of the $(M-1)$th state by the register of the $(I-1)$th stage, where I equals $1, 2 \ldots M$.

7. The circuit of claim 6 wherein said means for activating said other indicator is activated in response to all K of said registers attaining state $M-1$.

8. A circuit for subtracting a serial second decimal signal from a first decimal signal comprising K cascaded stages, where K is any integer $\geq 1$, each of said stages including: a first decimal register, means for supplying said first signal in nine's complement form to said register, means for advancing the count stored in said register in response to each serial digit of said second signal, a pair of decimal indicators responsive to the count stored in said register, each digit of one of said indicators being responsive to the nine's complement of the count stored in said register, each digit of the other of said indicators being responsive to the count stored in said register, means for selectively activating only one of said indicators at a time, said last named means including means for activating said other indicator only when the count of the second signal exceeds that of the first signal; means for setting the count of said registers to zero in response to the counts of said two signals being equal, and means for advancing the count stored in the register of the Ith stage in response to attainment of the ninth state by the register of the $(I-1)$th stage, where I equals $1, 2 \ldots M$.

9. The circuit of claim 8 wherein said means for activating said other indicator is activated in response to all K of said registers attaining stage nine.

10. The circuit of claim 8 wherein the register of each stage comprises; a switching tube having ten targets and a cathode, means for selectively establishing a discharge between each of said targets and said cathode; said last named means and said means for advancing including means for successively moving said discharge from one of said anodes to the adjacent anode.

11. The circuit of claim 10 wherein the indicators for each of said stages comprises: another discharge tube having ten electrodes between which discharge paths are established with a common electrode, means for selectively establishing a discharge between each of said ten electrodes and said common electrode of said another tube; said last named means including means for applying the discharge from each target of the first named tube to an electrode of said another tube.

12. The circuit of claim 10 wherein the states of said registers being denominated as $0, 1 \ldots G \ldots 9$, and said means for supplying the nines complement comprises: a further discharge tube having ten further targets and a further cathode, means for selectively establishing a further discharge between each of said further targets and said further cathode, said last named means being responsive to each digit of the first signal, and means activated after the count for the first signal is stored in said further tube for establishing a discharge path between the cathode and Gth target of said first named tube in response to a discharge path between the further cathode and $(9-G)$th further target, said targets of said tubes corresponding with said states.

13. The circuit of claim 8 wherein the indicators for each of said stages comprises: a discharge tube having ten electrodes and a cathode, means for selectively establishing a discharge between each of said electrodes and said cathode; said last named means including: means for establishing a current in response to the count stored in said register, and means for applying said current to one of said targets.

14. The circuit of claim 8 wherein said means for supplying in each stage comprises; a further register responsive to each digit of the first signal, and means activated after the count for the first signal is stored in said further register for transferring the count stored in the $(9-G)$th state of said further register to the Gth state of the first named register.

15. A circuit for nines complementing a decimal signal comprising first and second ten state decimal shift registers, said states being denominated as $0, 1 \ldots G \ldots 9$, means for applying said signal to said first register, and means activated after said signal has been stored in said first register for transferring the contents of the $(9-G)$th state of said first register to the Gth state of said second register.

16. The circuit of claim 15 wherein each of said registers includes a switching tube having ten anodes and a cathode.

17. In a computer responsive to serial input pulses, a first register, a second register, first and second switching tubes respectively included in said first and second registers, each of said tubes including a cathode and a plurality of anodes, a circuit for transferring the count in said first register to said second register, said circuit comprising means for selectively forming a beam of current between the cathode and only one anode of each of said tubes, means for normally stepping said beams between adjacent electrodes of each of said tubes in response to said input pulses, said beam forming means for said second tube including means selectively responsive to the flow of current through any one of the anodes of said first tube for initiating the flow of current to only a corresponding anode of said second tube.

18. The circuit of claim 17 wherein said beam forming means for said second tube comprises a separate electrode for each of said anodes of said second tube, each of said separate electrodes when energized tending to attract the beam of said second tube to its associated anode, switching means for selectively providing a low impedance path simultaneously between each of said separate electrodes and a corresponding anode of said first tube, the low impedance path between the first tube anode receiving current and the corresponding separate electrode of the second tube energizing the corresponding separate electrode, and means for directing the beam current of said second tube onto the second tube anode associated with the energized separate electrode in response to said low impedance path being established.

19. The circuit of claim 18 wherein the anodes of said first and second tubes are denominated 0, 1 . . . G . . . M, said low impedance paths being provided between the Gth anode of the first tube and the separate electrode associated with the (M−1−G)th anode of the second tube.

20. The circuit of the claim 18 wherein said means for selectively providing a low impedance path comprises a pair of back to back series connected diodes, said diodes being connected between the anode of said first tube and to one of the separate electrodes of said second tube, and a source of voltage for selectively forward and back biasing both of said diodes simultaneously, said source being connected to a junction between the diodes.

21. The circuit of claim 16 further including means for selectively forming a beam of current between the cathode and only one anode of each of said tubes, means for normally stepping said beams between adjacent electrodes of each of said tubes in response to said input pulses, said beam forming means for said second tube including means selectively responsive to the flow of current through any one of the anodes of said first tube for initiating the flow of current to a corresponding anode of said second tube.

22. The circuit of claim 21 wherein said beam forming means for said second tube comprises a separate electrode for each of said anodes of said second tube, each of said separate electrodes when energized tending to attract the beam of said second tube to its associated anode, switching means for selectively providing a low impedance path simultaneously between each of said separate electrodes and a corresponding anode of said first tube, the low impedance path between the first tube anode receiving current and the corresponding separate electrode of the second tube energizing the corresponding separate electrode, and means for directing the beam current of said second tube onto the second tube anode associated with the energized separate electrode in response to said low impedance path being established.

23. The circuit of claim 1 wherein said means for supplying comprises: a second ten state decimal shift register, said states of said registers being denominated as 0, 1 . . . G . . . 9, means for applying said first signal to said second register, and means activated after said first signal has been stored in said second register for transferring the contents of the (9−G)th state of the second register to the Gth state of said first register.

24. The circuit of claim 23 wherein said transferring means comprises: first and second switching tubes respectively included in said second and first registers, each of said tubes including a cathode and ten anodes, means for selectively forming a beam of current between the cathode and only one anode of each of said tubes, means for normally stepping said beams between adjacent electrodes of each of said tubes in response to said input pulses, said beam forming means for said second tube including means selectively responsive to the flow of current through any one of the anodes of said first tube for initiating the flow of current to only a corresponding anode of said second tube.

25. The circuit of claim 24 wherein said beam forming means for said second tube comprises a separate electrode for each of said anodes of said second tube, each of said separate electrodes when energized tending to attract the beam of said second tube to its associated anode, switching means for selectively providing a low impedance path simultaneously between each of said separate electrodes and a corresponding anode of said first tube anode receiving current and the corresponding separate electrode of the second tube energizing the corresponding separate electrode, and means for directing the beam current of said second tube onto the second tube anode associated with the energized separate electrode in response to said low impedance path being established.

References Cited by the Examiner

UNITED STATES PATENTS

| 2,956,748 | 10/1960 | Weissman | 235—176 |
| 3,033,459 | 5/1962 | Saylor | 235—168 |
| 3,064,889 | 11/1962 | Hupp | 235—92 |

OTHER REFERENCES

R. K. Richards: Digital Computer Components and Circuits, Van Nostrand, page 411, 1957.

MALCOLM A. MORRISON, *Primary Examiner.*

K. F. MILDE, *Assistant Examiner.*